May 28, 1940.  J. FERMANICK  2,202,447
CHAIN LOCKING MEANS
Filed March 7, 1939  4 Sheets-Sheet 1
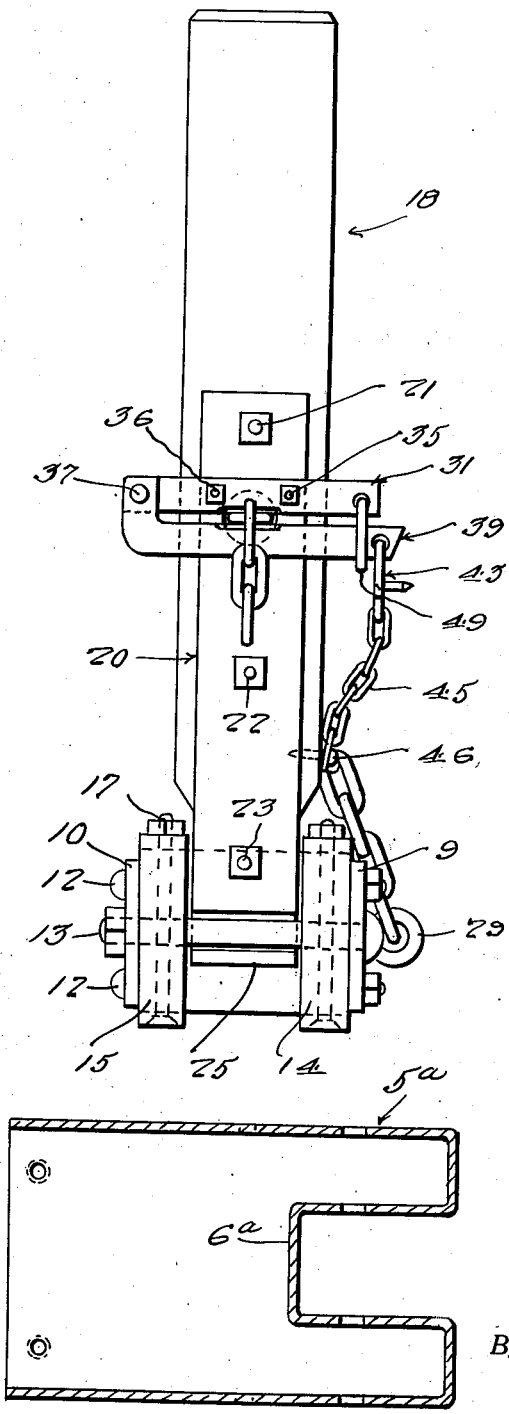
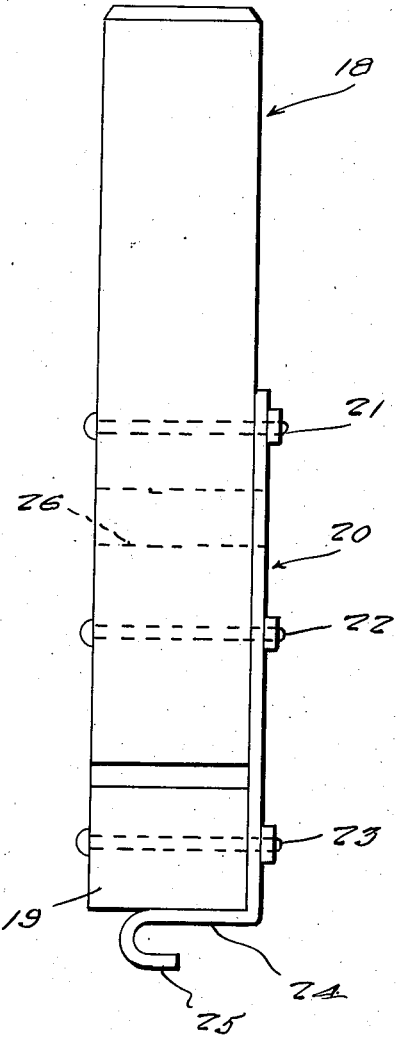
Inventor
J. Fermanick
By Clarence A. O'Brien
and Hyman Berman
Attorneys May 28, 1940.     J. FERMANICK     2,202,447
CHAIN LOCKING MEANS
Filed March 7, 1939     4 Sheets-Sheet 2
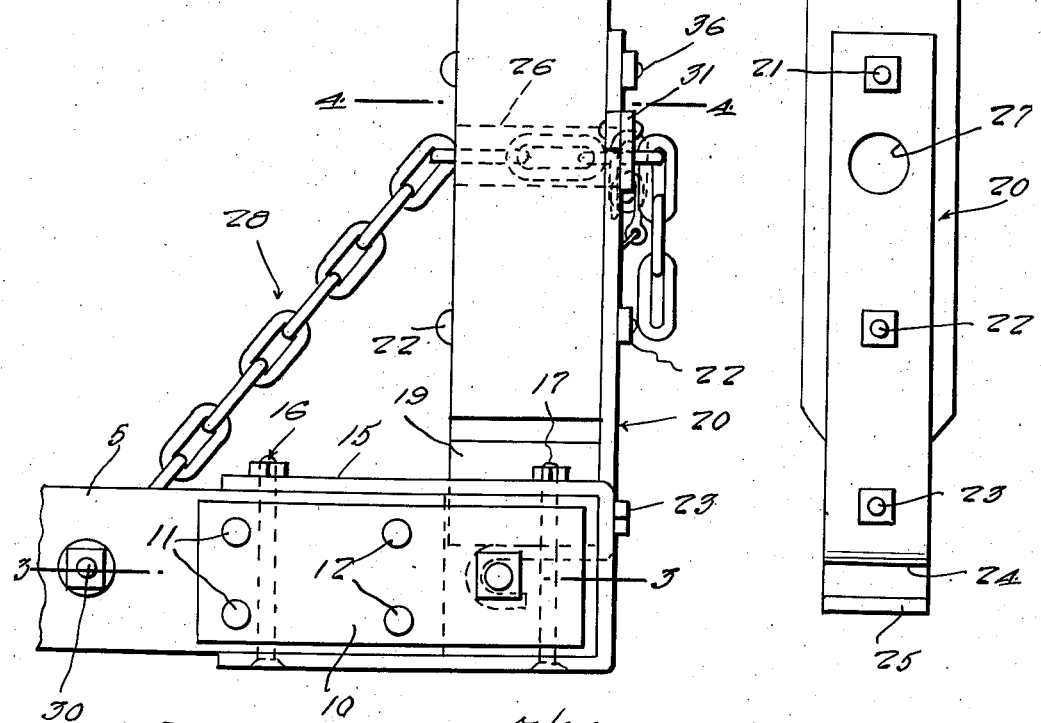
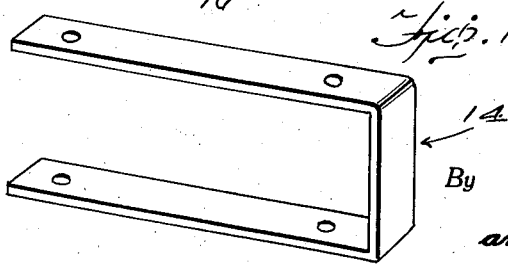
Inventor
J. Fermanick
By Clarence A. O'Brien
and Hyman Berman
Attorneys May 28, 1940.  J. FERMANICK  2,202,447
CHAIN LOCKING MEANS
Filed March 7, 1939    4 Sheets-Sheet 3
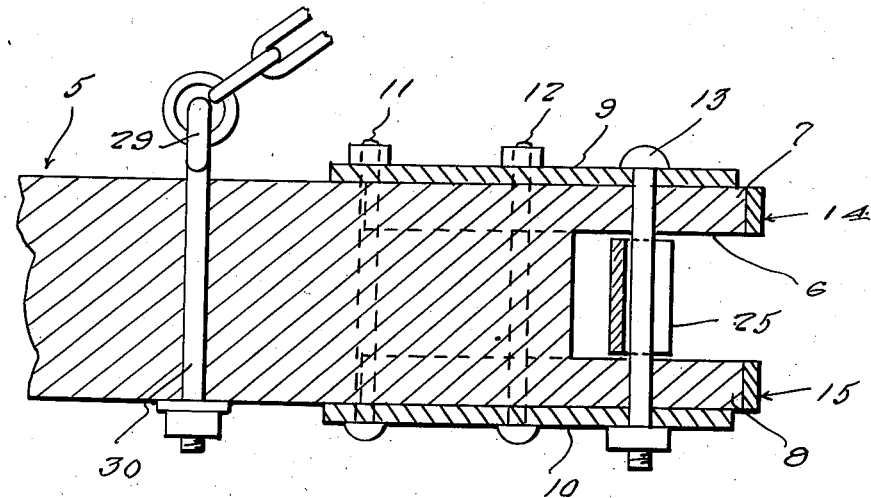
Fig. 3.
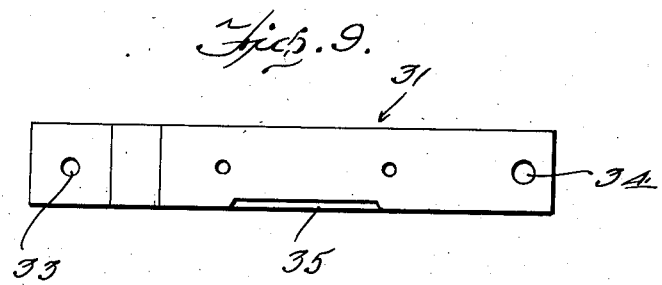
Fig. 9.
Fig. 10.
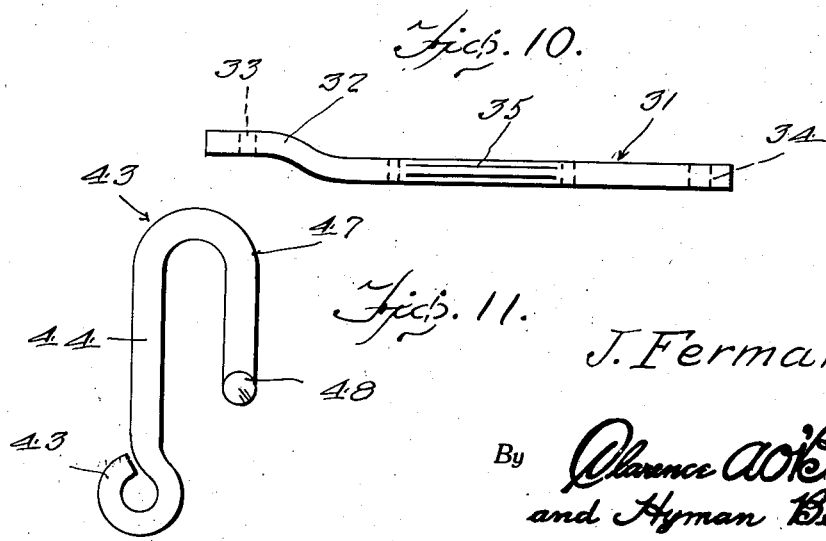
Fig. 11.
Inventor
J. Fermanick
By Clarence A. O'Brien
and Hyman Berman
Attorneys May 28, 1940.  J. FERMANICK  2,202,447
CHAIN LOCKING MEANS
Filed March 7, 1939  4 Sheets-Sheet 4

Inventor
J. Fermanick
By Clarence A. O'Brien
and Hyman Berman
Attorneys

Patented May 28, 1940

2,202,447

UNITED STATES PATENT OFFICE 2,202,447

CHAIN LOCKING MEANS

Joseph Fermanick, Neopit, Wis.

Application March 7, 1939, Serial No. 260,393

3 Claims. (Cl. 24—116)

This invention relates to chain locking means which are mainly designed for use with bunk and post structures of logging cars, the general object of the invention being to provide means whereby a part of a chain passing through the post can be easily and quickly fastened in adjusted position to the post and without danger of the chain slipping through the opening in the post.

The accompanying drawings show the invention in use for holding a part of a chain passing through an opening in the post of a logging car though it will be understood that the invention can be used wherever it is desired to hold the chain against movement.

In the drawings:

Figure 1 is an elevational view of the invention in use with the post of a logging car.

Figure 2 is a left hand side elevational view of Figure 1.

Figure 3 is a horizontal sectional view taken through Figure 2 approximately on the line 3—3 and looking downwardly in the direction of the arrow.

Figure 5 is a side elevational view of the trip stake or post.

Figure 6 is a right hand elevational view of Figure 5.

Figure 9 is a side elevational view of the upper and relatively stationary locking element.

Figure 10 is a top plan view of Figure 9.

Figure 11 is a side elevational view of the locking element chain hook.

Figure 13 is a perspective view of one of the two bunk end reinforcing elements.

Figure 14 is a horizontal sectional view taken through a modified form of bunk and reinforcing housing.

Figure 4:
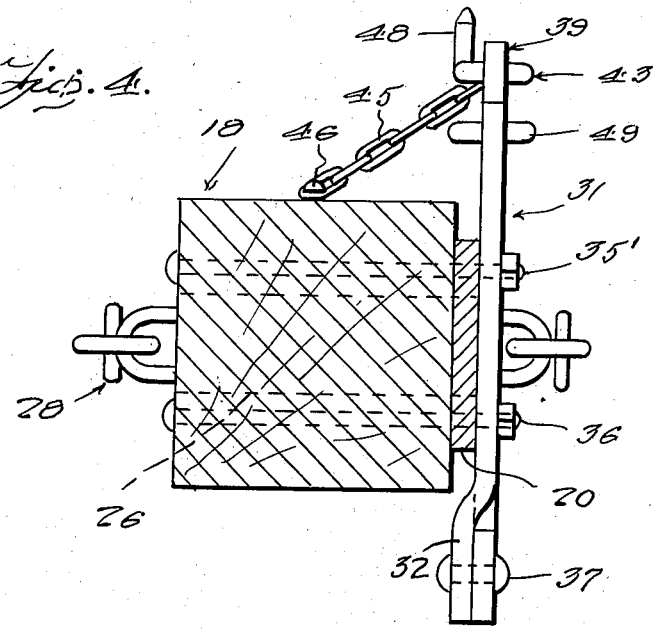
Figure 4 is a horizontal sectional view taken through Figure 2 approximately on the line 4—4 and somewhat enlarged.
Figure 7:
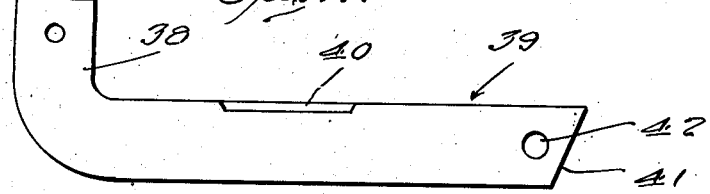
Figure 7 is a side elevational view of the lower swingable locking element.
Figure 8:
Figure 8 is a top plan view of Figure 7.

Referring in detail to the drawings, the numeral 5 generally designates one of the bunks of the logging car or the like, the same terminating in a rectangular cut out portion 6 which defines furcations 7 and 8. Lying along the outer side of each furcation and the adjacent portion of the bunk 5 are reinforcing plates 9 and 10, respectively, which are held in place by bolts 11 and 12, respectively, traversing the bunk 5 inwardly of the cut out portion 6 as illustrated in Figure 3 of the drawings. Also traversing the plates 9 and 10 and the furcations 7 and 8 is the trip stake supporting bolt 13. U-shaped reinforcing members 14 and 15 having their bight portions engaged with the extremities of the furcations and their legs engaging the top and bottom sides of the furcations and the adjacent portions of the bunk 5, and these are held in place by respective bolts 16 and 17 which traverse them and the bunk as indicated in Figure 2, the bolts 17 passing through the corresponding furcations.

In the modified form of bunk head as shown in Figure 14 and generally designated 5a, the unbifurcated terminal of the bunk is inserted in the conformably shaped housing as far as the bight of the cut out portion 6a, holes being provided in the resulting furcations to accommodate a pivot bolt similar to the bolts 13, and other holes being provided in the housing to accommodate attaching means similar to the bolts 11 and 12, passing through the bunk in a vertical manner.

Referring to Figures 5 and 6 of the drawings, the trip stake or post is generally designated 18 and this comprises a rectangular cross section standard which is reduced at its opposite sides adjacent the lower end thereof as indicated by the numeral 19 to a size such as will be freely received in the cut out 6 without impairing the strength of the standard. To the outer side of the standard is connected the mounting plate 20 which is vertically elongated and extends to the bottom end of the trip stake or post and is secured in place by vertically spaced bolts 21, 22, and 23, the latter bolt passing through the reduced portion 19 adjacent the lower end of the post. On the lower end of the plate 20 the same is bent laterally inwardly at right angles as indicated by the numeral 24 and the free end of this bend is bent downwardly and in the opposite lateral direction to provide the half journal 25 which hooks onto and turns on the pivot bolt 13. The pivot bolt 13 and the half journal 25 are so located with respect to the bight portion of the cut out 6 that the journal 25 can be engaged with the bolt 13 only while the post is in a semireclining position, and when the post is brought to the upright position illustrated in Figure 2, the weight of the post will be on the pivot bolt and the inner side of the lower part 19 of the post will bear against the bight of the said cut out 6, whereby further movement of the post in a left hand direction as seen in Figure 2 of the drawings is positively prevented.

An intermediate part of the post 18 has formed therein a cylindrical horizontal opening 26 which is in communication with a similar opening 27 in the mounting plate 20, and through these openings is adapted to pass the holding chain 28 which is secured to the eye 29 of an eye bolt 30 which passes horizontally through the bunk 5 at one side thereof as indicated in Figure 3 of the drawings. The free end of this chain 28 is passed through the said openings 26 and 27, the chain being sufficiently long so that the free end thereof may pass beyond these openings and have a link thereof held by the safety locking device to be described, whereby the chain is kept taut and thereby the post 18 is positively maintained in an erect position.

The said locking device comprises an upper relatively stationary locking element which is generally designated 31 and which is in the form of a horizontally elongated plate with one end thereof offset as indicated by the numeral 32 provided with a pivot receiving hole 33. The opposite end of this plate is provided with a locking link or loop receiving hole 34, while the lower edge of the plate 31 is reduced at both sides intermediate the ends of the plate to provide the relatively reduced edge portion 35 to efficiently engage between links of the chain 28 and to provide a strong frictional grip on the link engaged in the locking device. The bolts 35' and 36 traverse the upper relatively stationary plate 31, the mounting plate 20 and the post as indicated in Figure 4 of the drawings, whereby the plate 31 is securely mounted rigidly with respect to the post 18.

Figure 12:
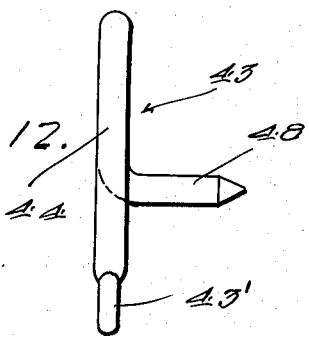
Figure 12 is an edge elevational view of Figure 11.

Traversing the pivot receiving hole 33 in the plate 31 is the pivot 37 which traverses the upstanding ear 38 on the lower and swingable locking element 39 which is in the form of a generally rectangular elongated plate provided on its upper edge intermediate its ends with registering depressions which result in the reduced edge portion 40 which is complementary to the edge portion 35 on the stationary locking element, for engagement with the particular link of the chain 28. The free end of the swingable locking element 39 is angularly undercut as indicated by the numeral 41 and adjacent this portion is the opening 42 for receiving the chain hook which is generally designated 43 and is shown in detail in Figures 11 and 12.

The chain hook 43 comprises the shank portion 44 terminating at one end in an eye 43' which is engaged with the locking chain 45 which has its lower edge secured by a screw or the like 46 entering the side of the post 18. The opposite end of the shank 44 terminates in the U-shape 47 whose free leg has the L-shaped formation apparent in Figure 12 of the drawings and designated by the numeral 48. A locking ring or link 49 is threaded through the opening 34 in the upper locking element 31 and is of a size to slip over the end of the lower locking element 39 to hold the locking elements in substantially parallel positions as indicated in Figure 1, whereby the reduced edges 35 and 40 grip the opposite sides of the link of the chain 28 in a horizontal position as illustrated in Figure 1 of the drawings. With the locking chain hook 43 engaged through the opening 42 in the lower swingable locking element 39, the ring 49 is prevented from being jogged off of the lower locking element, but is retained engaged therewith in such a position that the grip on the chain 28 is maintained.

Although I have shown and described herein a preferred embodiment of my invention, it is to be definitely understood that I do not desire to limit the application of the invention thereto, and any change or changes may be made in the materials and in the structure and arrangement of the parts, within the spirit of my invention and the scope of the subjoined claims.

Having described the invention, what is claimed as new is:

1. A chain locking device comprising an elongated upper locking bar, means for fastening said upper bar to a support, one end of the bar being offset, a lower elongated locking bar having one end bent at right angles, a pivot pin pivotally connecting the upper end of said bent end to the offset end of the first bar and a ring pivotally connected with that end of the first bar which is opposite the offset portion and fitting over the adjacent end of the second bar for holding the second bar in chain holding position against the first bar.

2. A chain locking device comprising an elongated upper locking bar, means for fastening said upper bar to a support, one end of the bar being offset, a lower elongated locking bar having one end bent at right angles, a pivot pin pivotally connecting the upper end of said bent end to the offset end of the first bar and a ring pivotally connected with that end of the first bar which is opposite the offset portion and fitting over the adjacent end of the second bar for holding the second bar in chain holding position against the first bar, the first bar having recesses formed in its side faces in an intermediate part thereof and at the lower edge thereof, said recesses forming a reduced elongated portion for engaging a part of the chain and the upper edge of the second bar having recesses in its faces forming a central reduced portion which is located opposite the reduced portion of the first bar.

3. A chain locking device comprising an elongated upper locking bar, means for fastening said upper bar to a support, one end of the bar being offset, a lower elongated locking bar having one end bent at right angles, a pivot pin pivotally connecting the upper end of said bent end to the offset end of the first bar and a ring pivotally connected with that end of the first bar which is opposite the offset portion and fitting over the adjacent end of the second bar for holding the second bar in chain holding position against the first bar, the first bar having recesses formed in its side faces in an intermediate part thereof and at the lower edge thereof, said recesses forming a reduced elongated portion for engaging a part of the chain and the upper edge of the second bar having recesses in its faces forming a central reduced portion which is located opposite the reduced portion of the first bar, that end of the second bar which is engaged by the ring extending beyond the adjacent end of the first bar and said end having a hole therein and a hook member for passage through the hole for preventing the second bar from being accidentally released from the ring.

JOSEPH FERMANICK.